US011255220B1

(12) United States Patent
McGrail et al.

(10) Patent No.: US 11,255,220 B1
(45) Date of Patent: Feb. 22, 2022

(54) HEATING ASSEMBLIES, HEAT EXCHANGE ASSEMBLIES, METHODS FOR PROVIDING AND/OR EXCHANGING HEAT, TURBINE COMBUSTION ENGINES, AND METHODS FOR POWERING TURBINE COMBUSTION ENGINES

(71) Applicant: Battelle Memorial Institute, Richland, WA (US)

(72) Inventors: B. Peter McGrail, Pasco, WA (US); Jeromy J. Jenks, Hines, OR (US); Bruce E. Bernacki, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 0 days.

(21) Appl. No.: 17/062,259

(22) Filed: Oct. 2, 2020

Related U.S. Application Data

(60) Provisional application No. 62/909,435, filed on Oct. 2, 2019.

(51) Int. Cl.
*F01D 25/12* (2006.01)
*F01D 5/28* (2006.01)

(52) U.S. Cl.
CPC ............ *F01D 25/12* (2013.01); *F01D 5/288* (2013.01); *F05D 2230/90* (2013.01)

(58) Field of Classification Search
CPC ....... F01D 25/12; F01D 5/288; F05D 2230/90
See application file for complete search history.

(56) References Cited

U.S. PATENT DOCUMENTS 7,572,096 B2 * 8/2009 Nonaka ................ F04D 29/023 415/90
2007/0148462 A1 * 6/2007 Hsiao ..................... C23C 28/34 428/408

(Continued)

OTHER PUBLICATIONS

Arpin et al., "Three-Dimensional Self-Assembled Photonic Crystals with High Temperature Stability for Thermal Emission Modification", Nature Communications 4, 2013, United Kingdom, 8 pages.

(Continued)

*Primary Examiner* — Igor Kershteyn
(74) *Attorney, Agent, or Firm* — Wells St. John P.S.

(57) ABSTRACT

Heat exchanger assemblies and methods for providing heat exchange as well as methods providing specific energy to predetermined materials within an assembly as well as gas turbine engines as well as methods of powering same are provided. Heating assemblies are provided that can include: a heat-sinking substrate; and a selective emitter layer in thermal communication with the substrate. These assemblies can be provided as part of heat exchanger assemblies. Methods for providing heat to a fluid are also provided that can include heating a layer upon a substrate to provide photons of a predetermined wavelength to a fluid from the layer.

Turbine combustion engines are also provided that can include a turbine having at least a portion of the blades in the hot section of the turbine coated with an emissivity layer in thermal communication with the turbine blade. Methods for powering turbine combustion engines are also provided.

24 Claims, 19 Drawing Sheets
(9 of 19 Drawing Sheet(s) Filed in Color)

Selective emitter coating
Heat transfer fluid
Heat transfer fluid
Heated $sCO_2$
Heat transfer fluid
Heated $sCO_2$
Pipe insulation
Heated $sCO_2$
Heat transfer fluid

(56) References Cited

U.S. PATENT DOCUMENTS

2013/0309076 A1* 11/2013 Nonaka .................. F04D 29/02 415/200
2017/0234228 A1* 8/2017 Ozcan ...................... F02C 7/24 60/739

OTHER PUBLICATIONS

Caliot et al., "Pressurized Carbon Dioxide as Heat Transfer Fluid: Influence of Radiation on Turbulent Flow Characteristics in Pipe", AIMS Energy vol. 3, Issue 2, 2014, United States, pp. 172-182.
Gell et al., "Higher Temperature Thermal Barrier Coatings with the Combined Use of Yttrium Aluminum Garnet and the Solution Precursor Plasma Spray Process", Journal of Thermal Spray Technology 27(4), Feb. 2018, United States, pp. 543-555.
Gordon et al., "The HITRAN2016 Molecular Spectroscopic Database", Journal of Quantitative Spectroscopy and Radiative Transfer 203, 2017, United Kingdom, pp. 3-69.
Ilic et al., "Tailoring High-Temperature Radiation and the Resurrection of the Incandescent Source", Nature Nanotechnology 11(4), Jan. 2016, United Kingdom, 7 pages.
Kaliteevski et al., "Tamm Plasmon-Polaritons: Possible Electromagnetic States at the Interface of a Metal and a Dielectric Bragg Mirror", Physical Review B 76(16), 2007, United States, 5 pages.
Reed, "Modeling of Flow and Thermal Energy Transport for High and Low Temperature Applications with Thermal Energy Storage", PhD Dissertation UC-Berkeley, 2016, United States, 82 pages.
Rinnerbauer et al., "Recent Developments in High-Temperature Photonic Crystals for Energy Conversion", Energy & Environmental Science 5(10), Aug. 2012, United Kingdom, pp. 8815-8823.
Rothman et al., "HITEMP, the High-Temperature Molecular Spectroscopic Database", Journal of Quantitative Spectroscopy & Radiative Transfer vol. 111, Issue 15, Oct. 2010, United Kingdom, pp. 2139-2150.
Tsai et al., "High Performance Mid-Infrared Narrow-Band Plasmonic Thermal Emitter", Applied Physics Letters 89, 2006, United States, 3 pages.
Yeng et al., "Enabling High-Temperature Nanophotonics for Energy Applications", Proceedings of the National Academy of Sciences of the United States of America vol. 109, No. 7, Feb. 2012, United States, pp. 2280-2285.
Alzahrani et al., "Energy and Exergy Analyses of a Parabolic Trough Solar Power Plant Using Carbon Dioxide Power Cycle", Energy Conversion and Management 158, 2018, United Kingdom, pp. 476-488.
Bull, "Techniques for Improving Thin Film Adhesion", Vacuum vol. 43(5), 1992, United Kingdom, pp. 517-520.
Caccia et al., "Ceramic-Metal Composites for Heat Exchangers in Concentrated Solar Power Plants", Nature vol. 562, 2018, United Kingdom, 14 pages.
Fox et al., "Oxygen Transport by Gas Permeation through the Zirconia Layer in Plasma Sprayed Thermal Barrier Coatings", Surface and Coatings Technology vol. 184, Jun. 2004, Netherlands, pp. 311-321.
Hayashi et al., "Thermal Expansion Coefficient of Yttria Stabilized Zirconia for Various Yttria Contents", Solid State Ionics vol. 176(5), Feb. 2005, Netherlands, pp. 613-619.
Iverson et al., "Supercritical C02 Brayton Cycles for Solar-Thermal Energy", Applied Energy 111, 2013, United Kingdom, pp. 957-970.
Jiang et al., "Design and Dynamic Modeling of Printed Circuit Heat Exchangers for Supercritical Carbon Dioxide Brayton Power Cycles", Applied Energy 231,2018, United Kingdom, pp. 1019-1032.
Khivsara et al., "Radiative Heating of Supercritical Carbon Dioxide Flowing through Tubes", Applied Thermal Engineering vol. 109, Oct. 2016, United Kingdom, pp. 871-877.
Ortega et al., "Coupled Modeling of a Directly Heated Tubular Solar Receiver for Supercritical Carbon Dioxide Brayton Cycle: Structural and Creep-Fatigue Evaluation", Elsevier, 2016, United Kingdom, 21 pages.
Rodilla et al., "Modeling the Major Overhaul Cost of Gas-Fired Plants in the Unit Commitment Problem", IEEE Transactions on Power Systems vol. 29, Issue 3, May 2014, United States, pp. 1001-1011.
Streyer et al., "Selective Absorbers and Thermal Emitters for Far-Infrared Wavelengths", Appl. Phys. Lett. 107, 081105, 2015, United States, 6 pages.
Tobler et al., "Plasma-Spray Coated Rare-Earth Oxides on Molybdenum Disilicide—High Temperature Stable Emitters for Thermophotovoltaics", Applied Energy vol. 85, Issue 5, May 2008, United Kingdom, pp. 371-383.
Yang et al., "Narrow-Band Thermal Emitter with Titanium Nitride Thin Film Demonstrating High Temperature Stability", Advanced Optical Materials vol. 8, Issue 8, Feb. 2020, United States, 8 pages.
Yang et al., "Narrowband Wavelength Selective Thermal Emitters by Confined Tamm Plasmon Polaritons", ACS Photonics 4(9), 2017, United States, pp. 2212-2219.
Zhang et al., "An Experimental Investigation on Characteristics of Supercritical CO2-Based Solar Rankine System", Int. J. Energy Res. Vol 35, 2011, United Kingdom, pp. 1168-1178.
Zhang et al., "An Experimental Study on Evacuated Tube Solar Collector Using Supercritical CO2", Applied Thermal Engineering 28, 2008, United Kingdom, pp. 1225-1233.

* cited by examiner

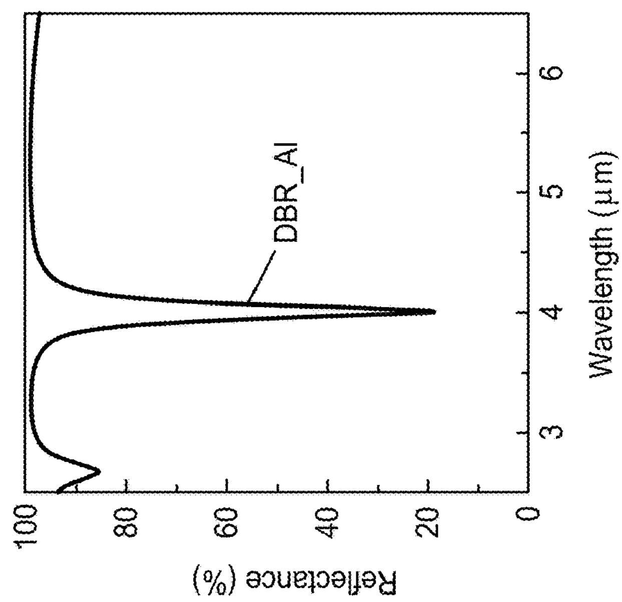
FIG. 5C
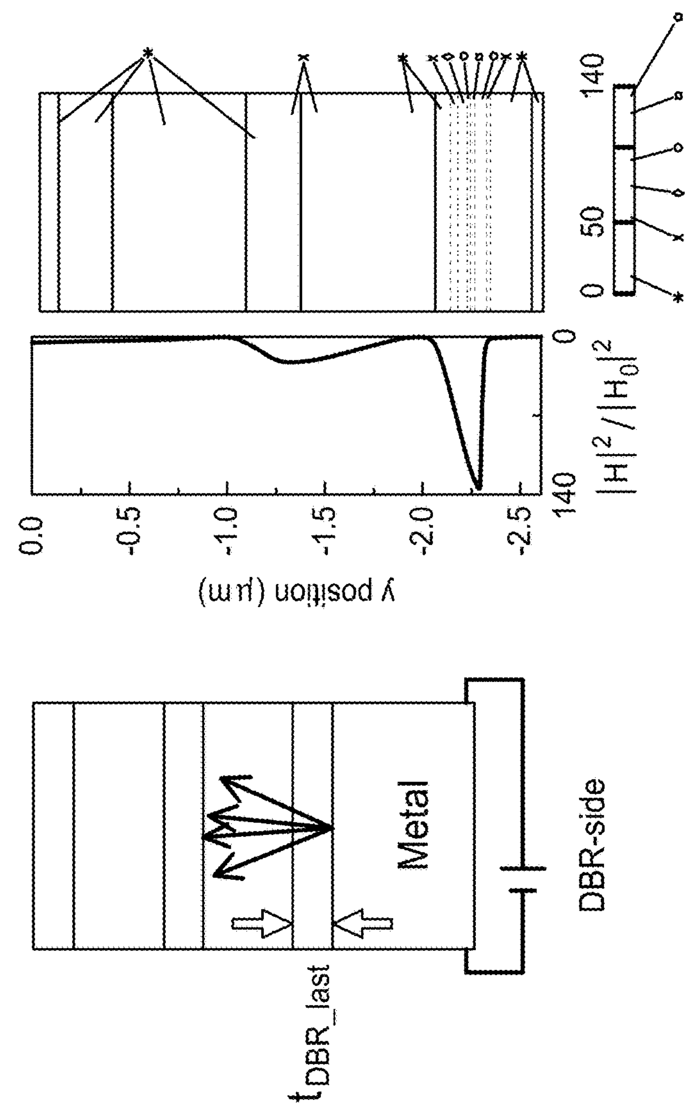
FIG. 5B
FIG. 5A

HEATING ASSEMBLIES, HEAT EXCHANGE ASSEMBLIES, METHODS FOR PROVIDING AND/OR EXCHANGING HEAT, TURBINE COMBUSTION ENGINES, AND METHODS FOR POWERING TURBINE COMBUSTION ENGINES

CROSS REFERENCE TO RELATED APPLICATION

This application claims priority to and the benefit of U.S. Provisional Patent Application Ser. No. 62/909,435 filed Oct. 2, 2019, entitled "Heat Exchange Assemblies, and Methods for Exchanging and Transferring Heat with Enhanced Thermal Radiation", the entirety of which is incorporated by reference herein.

STATEMENT AS TO RIGHTS TO DISCLOSURES MADE UNDER FEDERALLY-SPONSORED RESEARCH AND DEVELOPMENT

This disclosure was made with Government support under Contract DE-AC0576RL01830 awarded by the U.S. Department of Energy. The Government has certain rights in the invention.

TECHNICAL FIELD

The field of the invention is heating assemblies, heat exchange interfaces, heat exchange assemblies, and methods for transferring and exchanging heat between solids, liquids (including supercritical fluids), vapors, and gases including combustion gases in turbine engines and methods for powering same.

BACKGROUND

One limitation affecting ability to achieve the efficiency and cost saving advantages of a supercritical $CO_2$ ($scCO_2$) power cycle resides with the primary heat exchanger where costs can exceed 50% of the plant capital budget depending on design.

As an example, the supercritical carbon dioxide ($scCO_2$) cycle is of particular interest to energy agency offices, utility companies, and independent power producers. These entities are engaged in the development and commercialization of the $scCO_2$ Brayton cycle because it is a viable candidate to satisfy cost and efficiency targets for new thermal power generation in 2025 and beyond. This is primarily due to potential to achieve high conversion efficiency (>40%), dry cooling compatibility, and small size (influencing capital and O&M costs).

One of the limitations affecting ability to achieve the efficiency and cost saving advantages of an $scCO_2$ power cycle resides with the primary high temperature heat exchanger. Because $scCO_2$ has a much lower convective heat transfer coefficient compared with water (5 to 20× lower), a much larger and concomitant higher cost heat exchanger is required. This problem becomes progressively more severe with designs pushing temperatures of the $scCO_2$ to 800° C. and higher where heat exchanger costs can reach nearly 50% of the plant capital cost depending on design. Approaches to reduce these impacts have so far focused on fairly well-known methods of heat transfer enhancement, such as use of microchannel or microtube heat exchanger designs. There has also been recent attention on use of cermets with enhanced high-temperature failure strength, thermal conductivity, and corrosion resistance that could provide an attractive combination of properties for a robust heat exchanger. Still, a large gap remains in being able to reduce heat exchanger size and cost.

Coatings on turbine blades today are principally designed to provide a thermal barrier (a TBC) to protect the blade from reaching temperatures higher than the operational capability of the base metal. Still, many combustion turbine designs flow air behind the turbine blade to remove heat and control the blade temperature. This heat is lost to the environment and therefore reduces efficiency of the turbine.

SUMMARY

Heat exchanger assemblies and methods for providing heat exchange as well as methods providing specific energy to predetermined materials within an assembly as well as gas turbine engines as well as methods of powering same are provided.

Heating assemblies are provided that can include: a heat-sinking substrate; and a selective emitter layer in thermal communication with the substrate, the layer configured to provide photons of a predefined wavelength upon receiving heat from the substrate.

Heat exchanger assemblies are also provided that can include: a heat-sinking substrate between two fluid passageways, a first fluid of the heat exchanger configured to provide heat to the heat-sinking substrate; and an emissivity layer in thermal communication with the substrate, the layer configured to provide photons of a predefined wavelength to a second fluid of the heat exchanger upon receiving heat from the heat-sinking substrate.

Methods for providing heat to a fluid are also provided that can include heating a layer upon a substrate to provide photons of a predetermined wavelength to a fluid from the layer.

Turbine combustion engines are provided that can include a turbine having one or more blades, at least a portion of the blades in the hot section coated with an emissivity layer in thermal communication with the blade, the layer configured to provide photons to combustion products of the engine upon receiving heat from the blade.

DRAWINGS

The patent or application file contains at least one drawing executed in color. Copies of this patent or patent application publication with color drawing(s) will be provided by the Office upon request and payment of the necessary fee.

Embodiments of the disclosure are described below with reference to the following accompanying drawings.

FIG. 5A is an example heat exchanger interface material according to an embodiment of the disclosure.

FIGS. 5B and 5C are both light wavelengths emitted by the material of FIG. 5A according to an embodiment of the disclosure.

DESCRIPTION

Figure 1B:
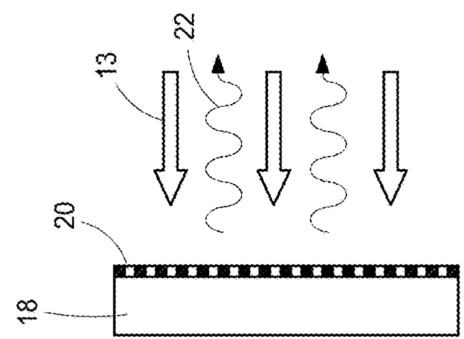
FIG. 1B is an alternative configuration of a heat exchanger assembly according to an embodiment of the disclosure.

This disclosure is submitted in furtherance of the constitutional purposes of the U.S. Patent Laws "to promote the progress of science and useful arts" (Article 1, Section 8).

Embodiments of the present disclosure provide a new type of heat exchanger optimized to take advantage of radiative heat transfer to $scCO_2$. Heat exchanger assemblies can include a selective thermal emission coating applied to the heat exchanger surfaces that will radiate light predominantly between 4 and 4.5 μm where the infrared absorption of $CO_2$ is maximal. Heat exchangers implementing this selective thermal emission coating can be 25% to as much as 40% smaller than conventional heat exchanger designs.

The present disclosure will be described with reference to FIGS. 1A-18. Referring first to FIG. 1A, an example heat exchange assembly 10 is shown having a heat exchanger interface assembly 16 that can include at least two components; a thermal absorber and/or support component 18 (for example a heat-sinker substrate) and a selective thermal emission coating or emitter layer 20 (sometimes referred to as STERIDIAN). In accordance with example implementations, heat source 12 can be on one side of assembly 16 while a fluid 14 is on an alternate side of assembly 16. In accordance with example implementations, layer 20 can be in thermal communication with substrate 18 and the layer can be configured to provide photons of a predefined wavelength upon receiving heat from the substrate. The selective emitter layer material or coating can include one or more of Si, Ag, Cr, Au, Ti, W, Zr, Hf, Nb, Ta, Al, Mo, and/or their corresponding oxides and/or carbides/nitrides/borides.

In accordance with example implementations, source 12 can be a radiation source such as solar, for example, or other thermal source that can convey broad band radiation 13. It can also be a fluid source such as a molten metal or salt source, or a liquid source. In heating assemblies and/or heat exchanger assemblies this can be referred to as the heat transfer fluid. In accordance with example implementations, this material can reach substantial temperatures in order to provide heat via conduction and/or convection to support 18, which can be in thermal equilibrium with the selective emission coating 20. In accordance with example implementations, support 18 can be a metal or metal alloy. Support 18 can include additional materials but conducts heat to coating 20. Cap layers and/or bond coats can be provided as well.

Fluid 14 can be a supercritical fluid such as $scCO_2$ and/or water ($scH_2O$). In accordance with example implementations, $scCO_2$ can experience a heightened heat exchange when receiving wavelengths of photons in the range of 4.0 to 4.5 μm. In accordance with example implementations, the $scH_2O$ can also receive heightened heat exchange when receiving photons in the range of 2.8 μm.

The heat of material 12 can cause emission of narrow band radiation such as photons 22 from selective thermal emission coating 20 which can increase the temperature of fluid 14, for example. Selective thermal emission coating 20 can include but is not limited to, Ag, Cr, Au, Ti, W, Al, Mo, Pt, tungsten and sapphire; and/or ZnSe; aluminum (Al—Si/$SiO_2$); combinations of gold, chromium and/or silver silicon oxide may be utilized, as well as refractory materials such as metal carbides, nitrides, and/or borides. In accordance with example implementations, these materials when provided with heat can emit photons in desired wavelengths that heat the fluid 14.

Figure 1A:
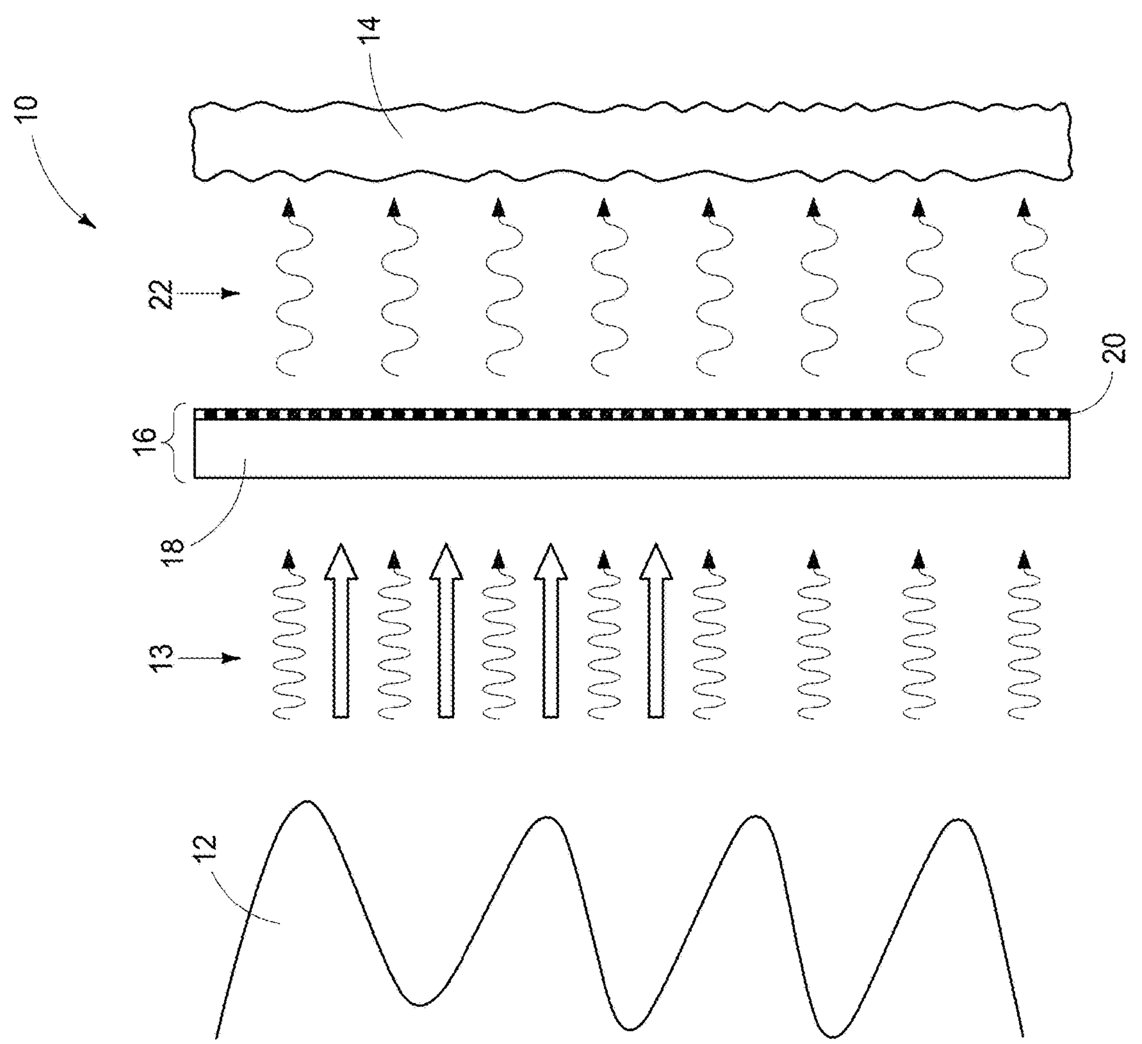
FIG. 1A is a heat exchanger assembly according to an embodiment of the disclosure.

Referring next to FIG. 1B, an alternative embodiment of the present disclosure is provided that includes a substrate 18 with an emitter coating 20 applied thereto as described with reference to FIG. 1A as well. However, in this configuration, convection or conduction heating of substrate 18 can be received from the same side as the emitter coating, and the emitter coating can provide the focused photons 22 as described. In accordance with example implementations, this configuration can also receive energy in the form of heat from alternative surfaces of substrate 18, including convection as well as conductive energy from a thermal link as desired.

Figure 2:
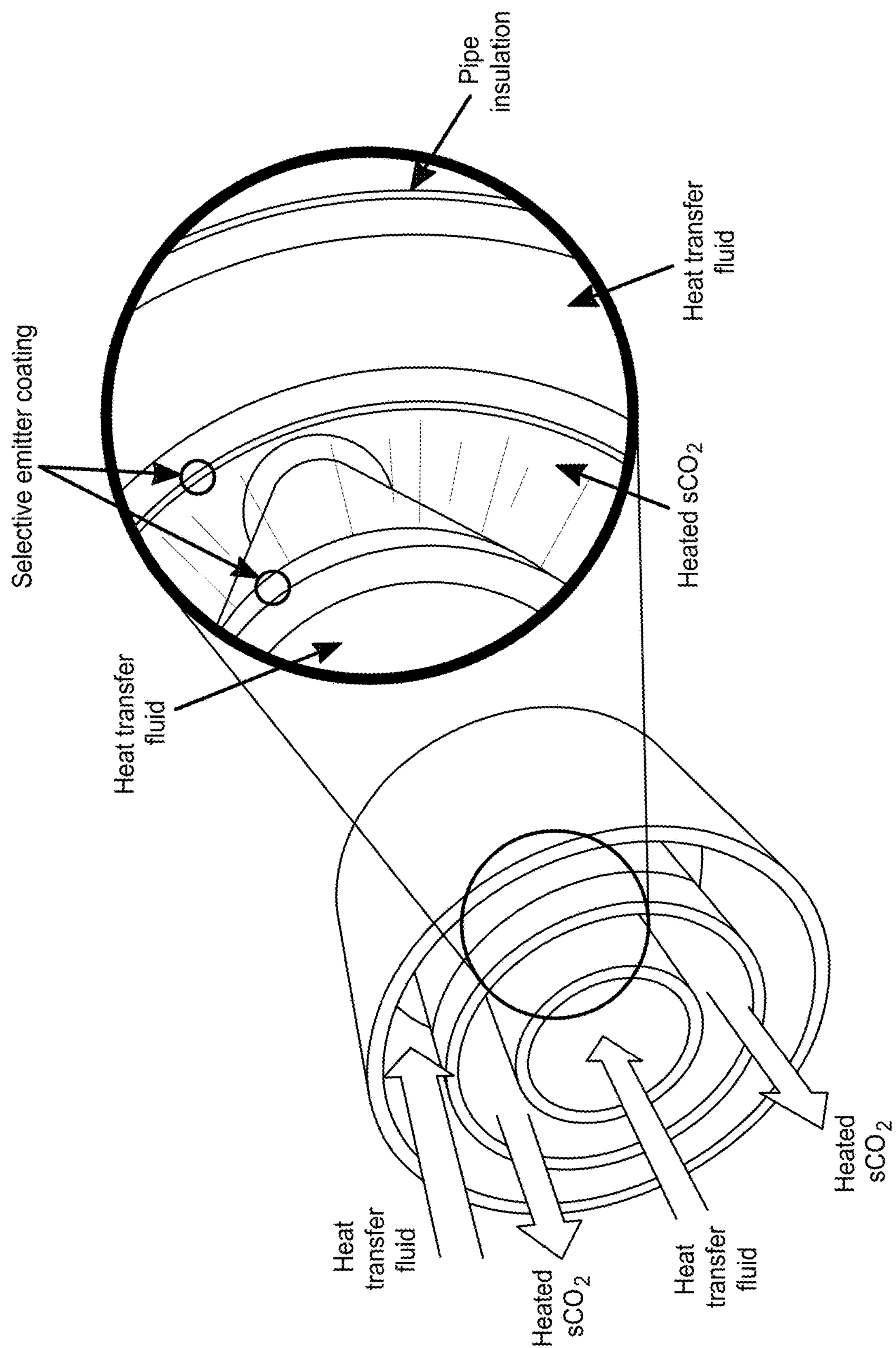
FIG. 2 is a heat exchanger according to an embodiment of the disclosure.

Referring next to FIG. 2, a heat exchanger is shown that includes at least two heat transferred fluid portals about a fluid portal conveying $scCO_2$. In accordance with example implementations, the heated $scCO_2$ can be conducted through a conduit that includes selective emission coating as described previously in FIG. 1. Accordingly, the selective thermal emission coating on the heat exchanger surfaces can radiate light into the $scCO_2$, and this light emitted can be tuned to, for example in the case of $scCO_2$, 4.2 μm absorption band, thereby maximizing the rate of radiant heat transferred to the $scCO_2$.

As shown in FIG. 2, the heat exchanger can have a heat-sinking substrate between two fluid passageways. The first fluid of the heat exchanger can be configured to provide heat to the heat-sinking substrate, and the emissivity layer can be in thermal communication with the substrate. The layer can be configured to provide photons of a predefined wavelength to a second fluid of the heat exchanger of the upon receiving heat from the heat-sinking substrate. The second fluid can be within a passageway having interior and exterior walls. As depicted in FIG. 2, both walls can include the emissivity layer. The heat exchanger assembly can define passageways interior of the interior wall and exterior of the exterior wall, the passageways conveying the first fluid. As shown the first fluid can be the heat transfer fluid and the assembly can be substantially tubular.

In accordance with example implementations, the assemblies and methods of the present disclosure can be used to heat a layer upon a substrate to provide photons of a predetermined wavelength to a fluid from the layer. The layer can be conductively heated from a heat-sinking substrate and/or convectively heated itself or from a heat-sinking substrate.

Figure 3B:
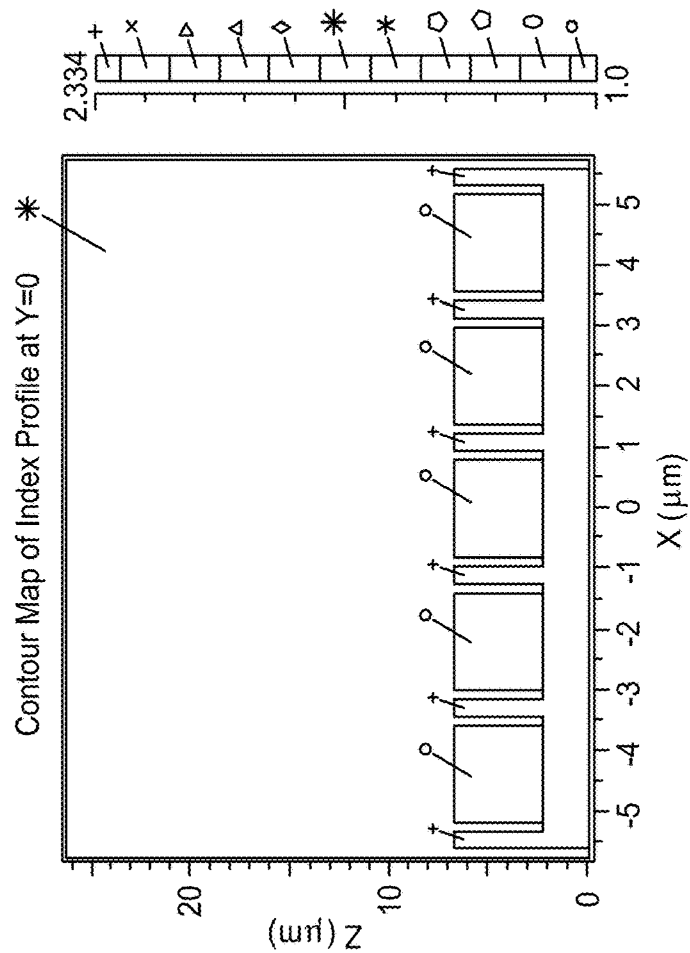
FIG. 3B is a contour map of the material of the heat exchanger interface of FIG. 3A.
Figure 3A:
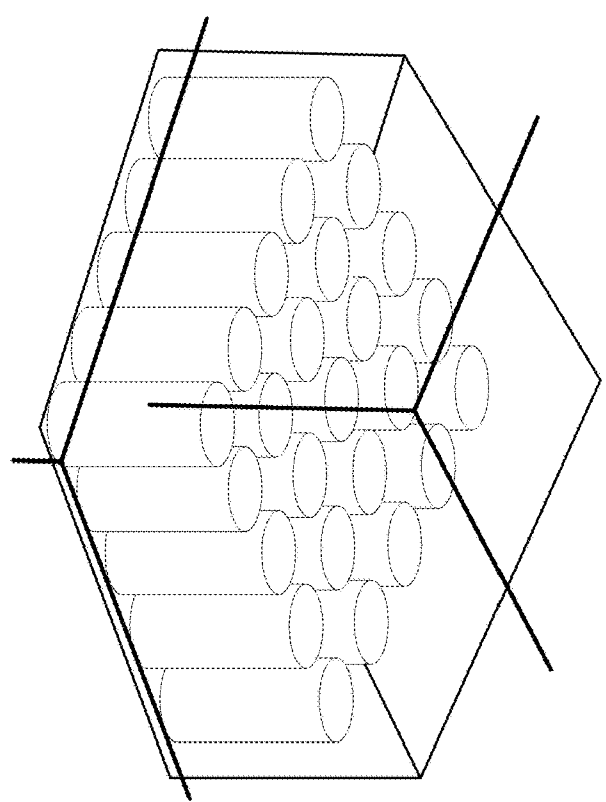
FIG. 3A is an example portion of a heat exchanger interface according to an embodiment of the disclosure.
Figure 4:
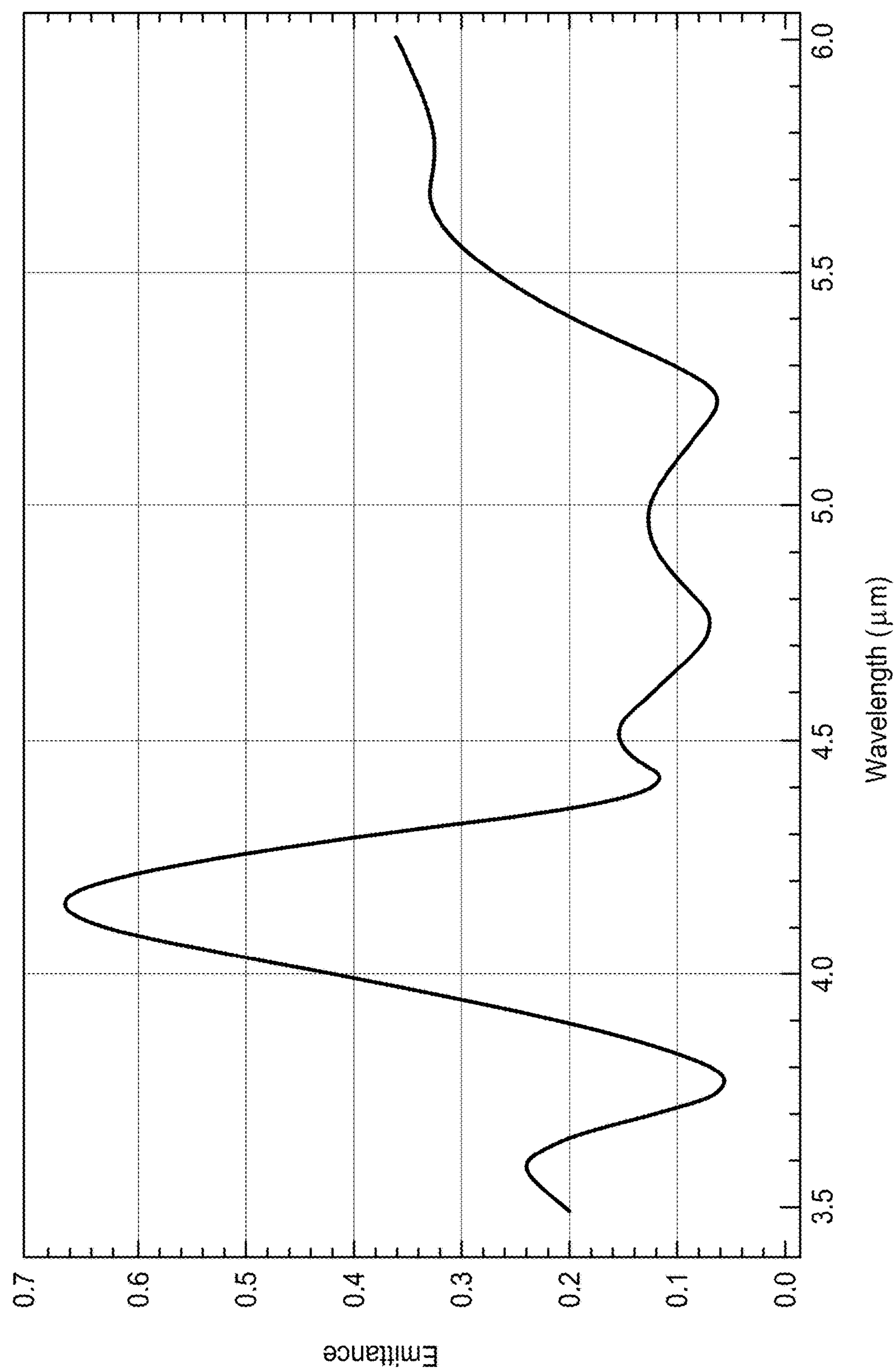
FIG. 4 is an example wavelength emitted by the materials of FIG. 3A according to an embodiment of the disclosure.

Referring to FIGS. 3A and 3B, a 3D model of an example emission coating and index of refraction of a contour map of the coating is depicted. The coating can include a tungsten base and air-filled cavities, all enclosed in sapphire (transparent in IR) to prevent $scCO_2$ from filling the cavity structure and absorbing the photon flux. This is but one example of the surface structures that can be defined by coating 20. Additional structures can include, but are not limited to, one or more of pillars, recesses, cavities, platforms, and/or towers. The cavities can have a depth d of 5.32 μm, a radius r of 1.19 μm, and center-to-center pitch a of 2.97 μm. In accordance with example implementations and with reference to FIG. 4, photon emission of the materials of FIGS. 3A and 3B, can be in a 4.2 μm band where absorption in $scCO_2$ is maximized. Accordingly, photons having a wavelength between 3.8 and 4.5 um can be provided.

Referring next to FIGS. 5A-5C, yet another material is shown in FIG. 5A having alternating layers of Si and $SiO_2$ and aluminum as the metal at the base. This structure can be adjusted to tune the emission to 4.2 μm band and use a higher melting point metal. In accordance with example implementations, the emissions of this material are shown in FIGS. 5B and 5C graphs.

Figure 6A:
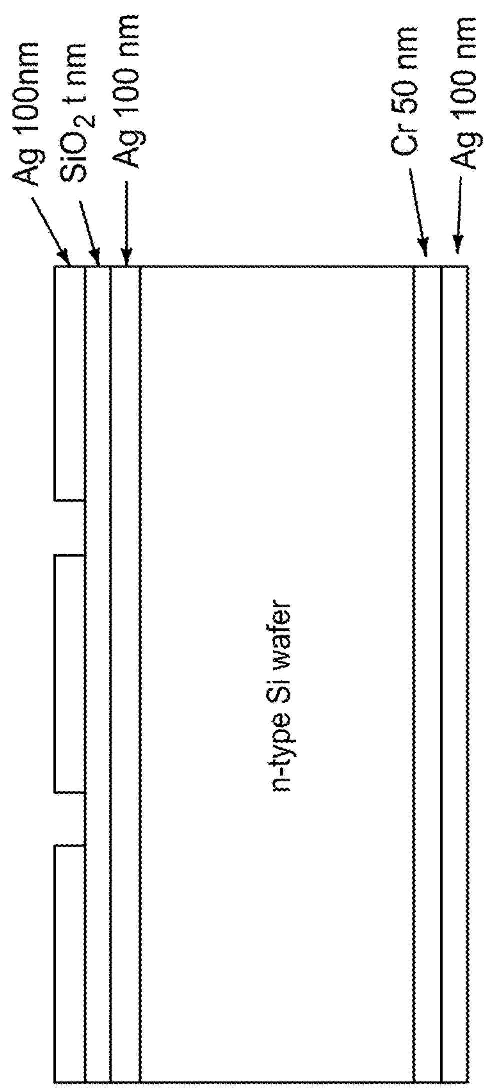
FIG. 6A is yet another example heat exchanger interface according to an embodiment of the disclosure.
Figure 6B:
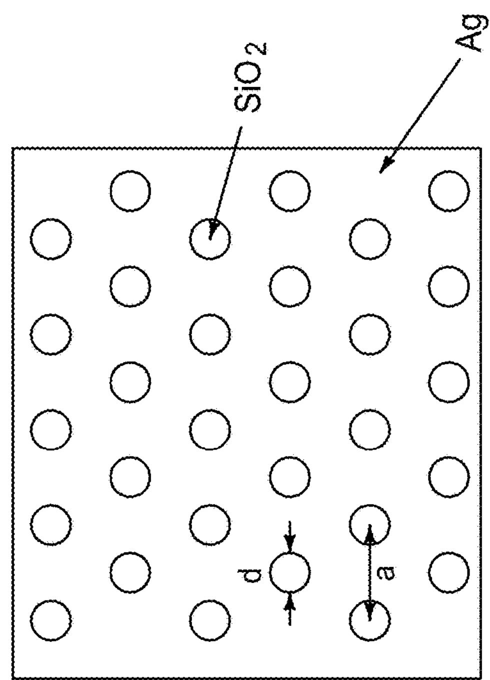
FIG. 6B is another depiction of the example interface material of FIG. 6A according to an embodiment of the disclosure.
Figure 6C:
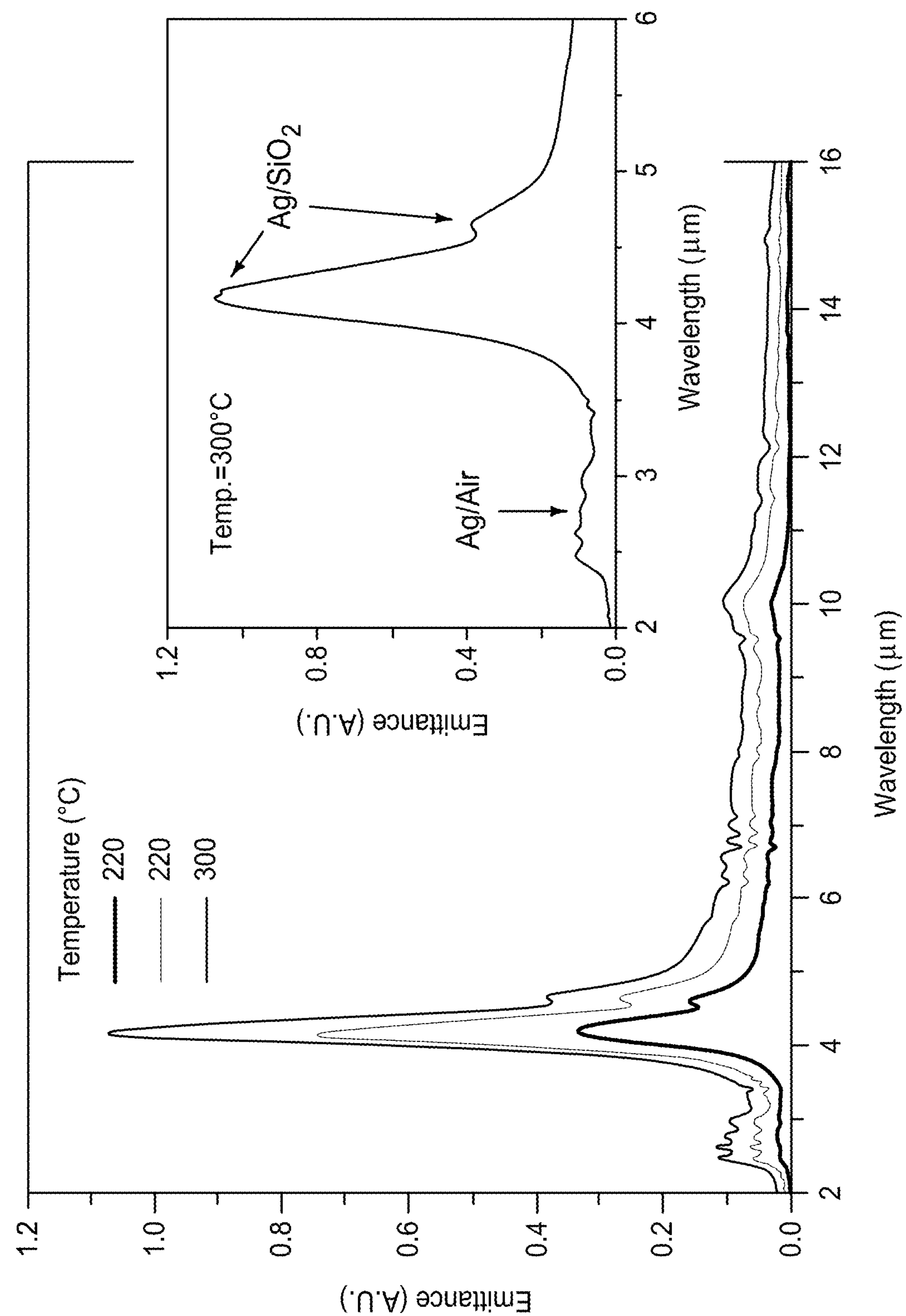
FIG. 6C is an example wavelength emitted by the material of FIGS. 6A and 6B according to an embodiment of the disclosure.

Referring next to FIGS. 6A-6C, yet another material is shown in FIG. 6A that includes surface plasmon polaritons configured to induce light radiation. The schematic diagram or cross section 6A and top views of coating in 6B are shown having a thickness t of $SiO_2$ is 100 nm and the hexagonal hole array can have a lattice constant α of 3 μm and a diameter d of 1.5 μm. This material can have the shown emission spectra of FIG. 6C.

Figure 7:
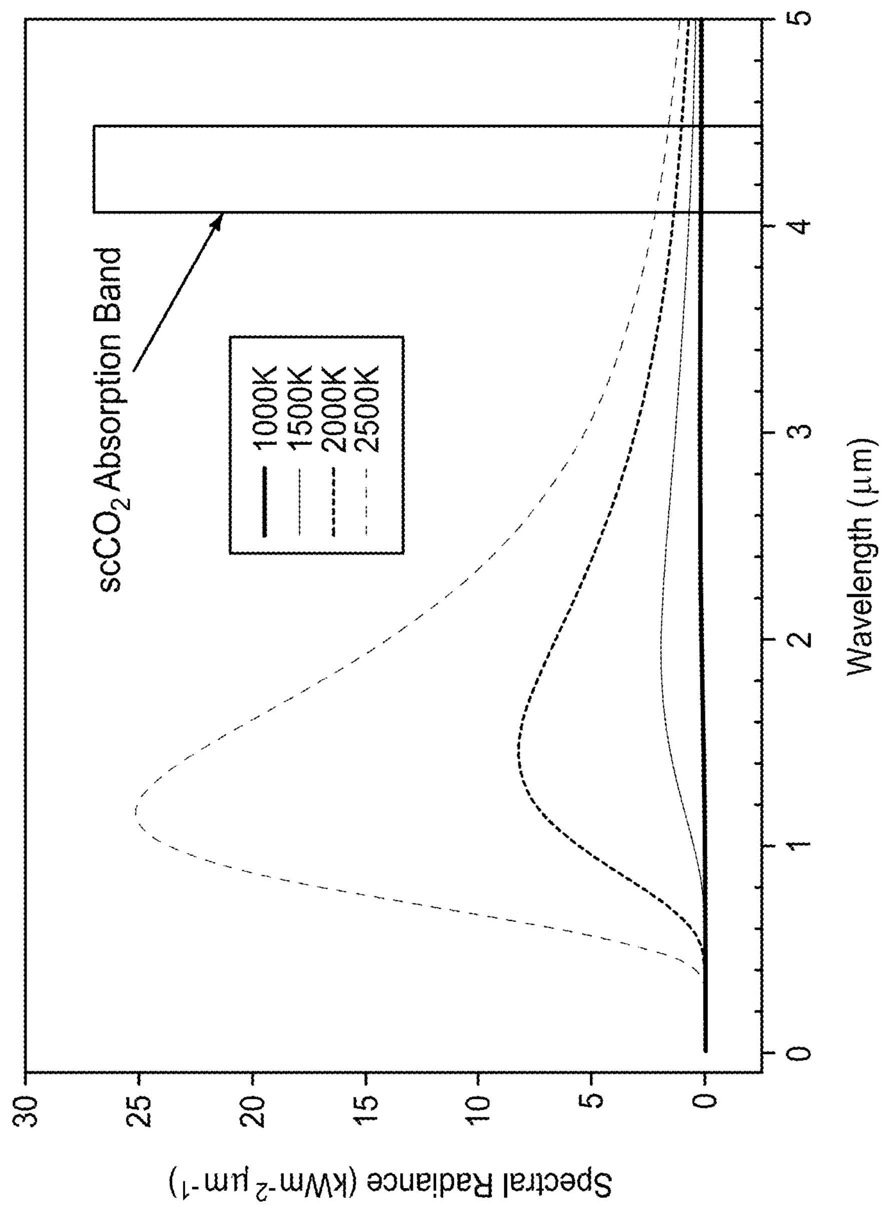
FIG. 7 is an example emission by a non-emitting interface according to an embodiment of the disclosure.

Referring next to FIG. 7, data of an example of a material having photon emission following Planck's thermal radiation law with most of the emissions falling outside a beneficial range where absorption by a heat transfer fluid (such as $scCO_2$) occurs.

Figure 8:
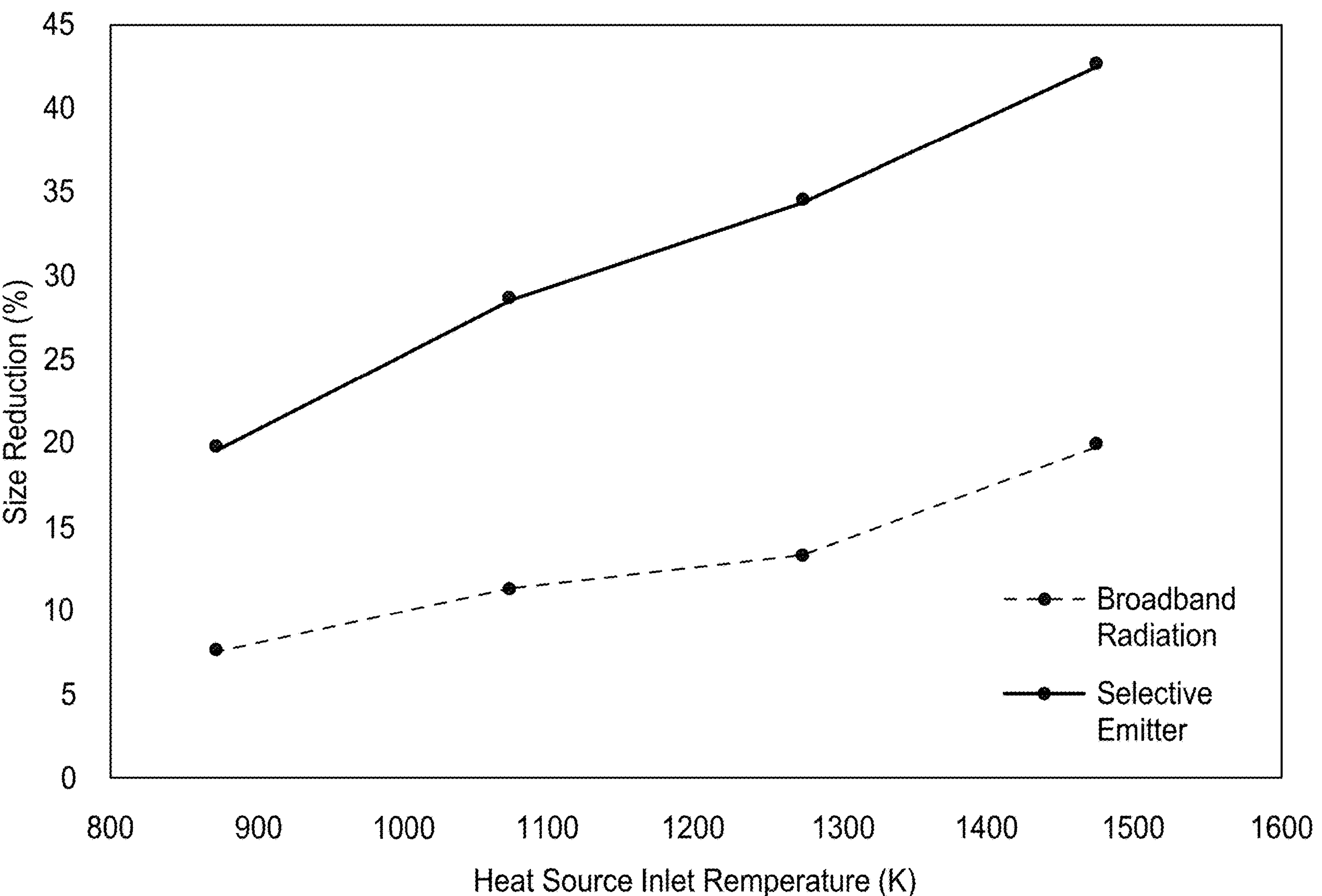
FIG. 8 is a comparison between standard interfaces and interfaces modified according to embodiments of the disclosure.

Next, referring to FIG. 8, a heat exchanger with the selective emission coating is shown to have an almost 45% size reduction at 1500K in comparison to a standard heat exchanger with broadband radiation, thereby showing the substantial increase in efficiency of using the selective emission coating at the heat exchanger interface.

Figure 9:
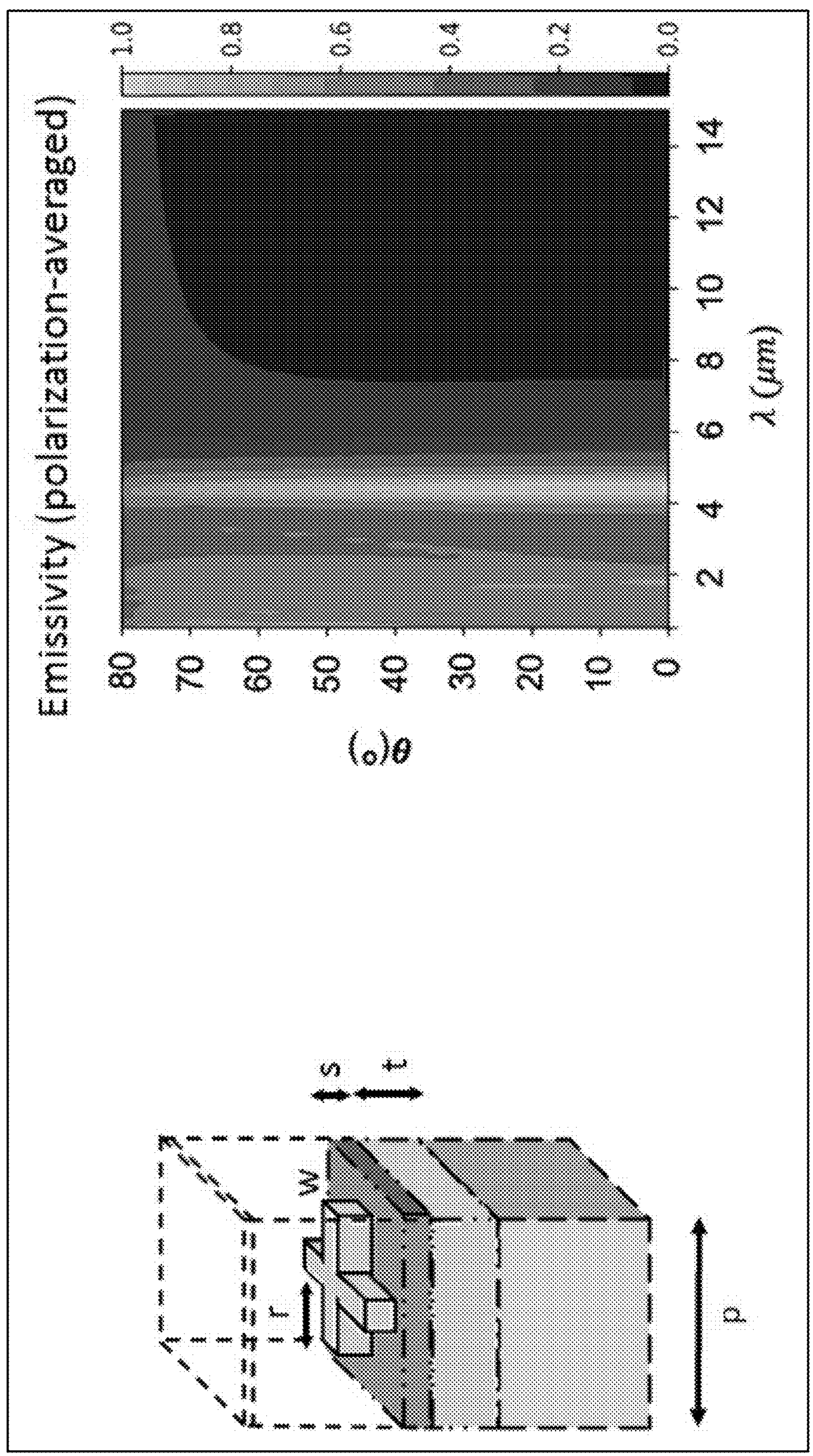
FIG. 9 is a depiction of a photonic crystal motif according to an embodiment of the disclosure.

In accordance with example implementations and with reference to FIG. 9, a two-dimensional photonic crystal motif is depicted. In accordance with example implementations, this motif can maintain strong peak of emission in the 4-4.5 μm range over all emission angles and both polarizations. In accordance with example implementations, this photonic crystal can include a periodic array of sub-wavelength structures (pillars, crosses, or cavities) as illustrated. The periodic structure can give rise to band gaps caused by destructive interference of multiple reflections of light propagating in the crystal at interfaces of high and low dielectric constant regions. As shown in the depicted FIG. 9, emissivity above 80% in the desired band can be obtained using a platinum pillar above a silica dielectric spacer with dimensions, for example, p=1.7 μm, h=80 nm, r=570 nm, w=580 nm. An advantage of the photonic crystal configuration is that it can be manufactured of a single material and can be stable with respect to thermal cycling.

Figure 10:
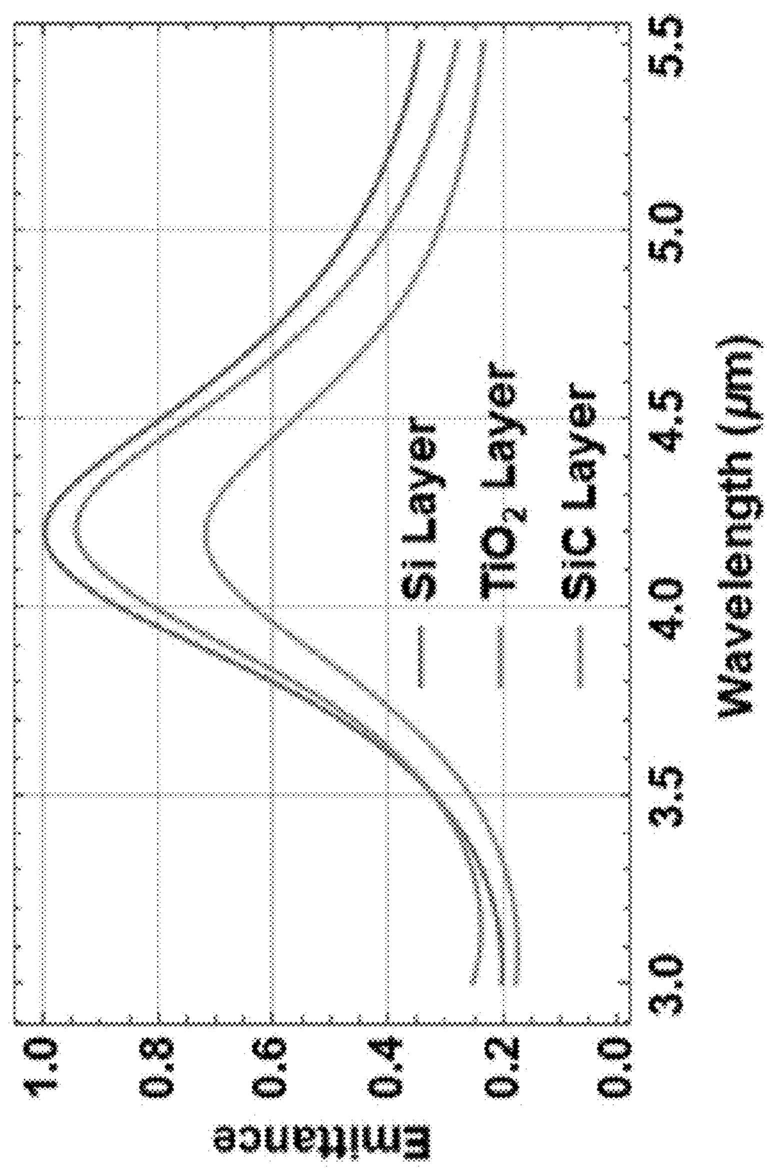
FIG. 10 is admittance vs wavelength TiN/$HfO_2$-based DBR design according to an embodiment of the disclosure.

Referring next to FIG. 10, emittance vs. wavelength for $TiN/HfO_2$-based distributed Bragg reflector (DBR) design is depicted. FIG. 10 depicts the same design but with SiC replaced by either Si or $TiO_2$. The SiC design shows only a small loss (≈5%) in emittance as compared with Si making it a sound element for the emissivity layer capable of operating at substantially higher temperatures.

Figure 11:
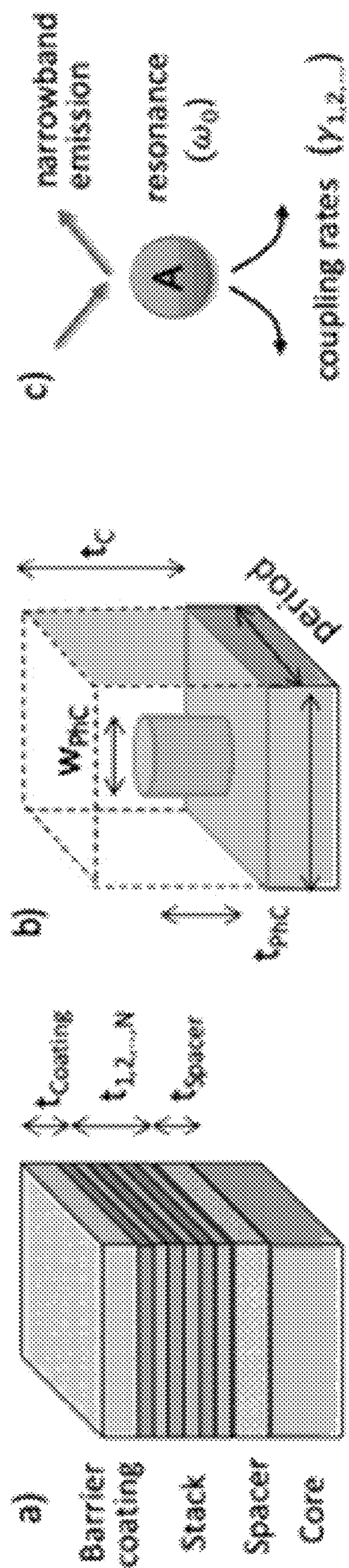
FIG. 11 is an example multi-layer thin film selective emitter coating according to an embodiment of the disclosure.

Referring next to FIG. 11, an example preparation of a multi-layer thin film selective emitter coating is depicted that includes a) the emitter coating; b) the photonic crystal selective emitter; and c) the analytic coupled-mode theory model of narrowband emission.

Photonic configurations can include thin-film multi-layer coatings FIG. 11 *a*) and photonic crystal (PhC) coatings FIG. 11 *b*). To have an emissivity layer that is stable at high-temperatures, refractory metals (e.g. W, Ti, Ni, Mo) and metal-oxides (e.g. $Ta_2O_5$, $TiO_2$, $ZrO_2$), nitrides, and/or borides may be utilized. When contemplating the oxidizing and corrosive environment of turbine engine exhaust, a protective capping barrier on top of the emissivity coating can be provided. To avoid detrimental impact of the cap layer on the emissive properties, optically transparent ceramics suitable for high-temperature operation such as yttria-stabilized hafnia (m.p. 2,790° C.), YSZ (m.p. 2,690° C.), and newer high-temperature capable materials like yttria-alumina-garnet (YAG) may be utilized.

Analytical models can be developed to predict the electromagnetic nature of photonic modes most suitable for high-temperature and 4-4.5 μm narrowband emission. Based on temporal coupled-mode theory, these models can provide abstracts of the unintuitive and non-convex design space of geometrical dimensions and material candidates into a low-dimensional space of photonic resonant frequencies and coupling modes (FIG. 11 *c*). Coupled-mode theory is applicable both for thin-film and photonic crystal coatings.

Figure 12:
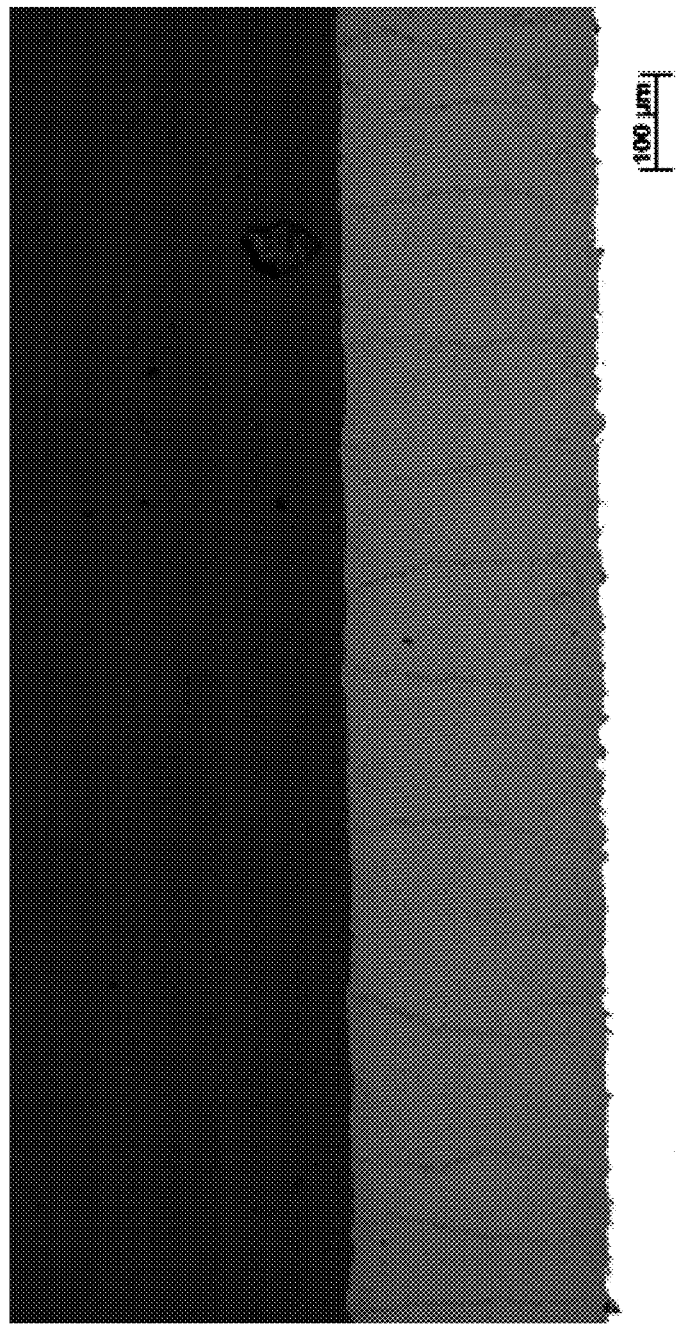
FIG. 12 is an example cross section of an emitter coating according to an embodiment of the disclosure.

Referring next to FIG. 12, a plasma sprayed dense vertically microcracked microstructure showing low surface roughness is depicted, which is an example configuration of the emitter coating utilized herein. Thermal barrier coated samples can be produced prior to coating with selective emitting layers. These assemblies can be fabricated on conventional Ni-based superalloy button substrates or other suitable substrate, metal or ceramic. The superalloy substrates can be coated first with PtAl bondcoats followed by a topcoat of dense vertically microcracked suspension plasma sprayed (SPS) thermal barrier coating. The thermal barrier coating can be provided as a two-layer 7 wt % YSZ ceramic bondcoat and gadolinium zirconate (GZO) topcoat. The final structure of the thermal barrier layer will be chosen based on the efficiency of emissivity layers with thicker GZO layers being implemented when lower thermal conductivity is required for the system. This coating process can produce low surface roughness coatings as seen in FIG. 12. As-sprayed surface roughness (Ra) has been measured as low as ~0.5 μm. If finer surface finishes are required for high performance of the selective emitter layers, vibrofinishing or surface polishing of the as-sprayed coating can be employed.

Figure 13:
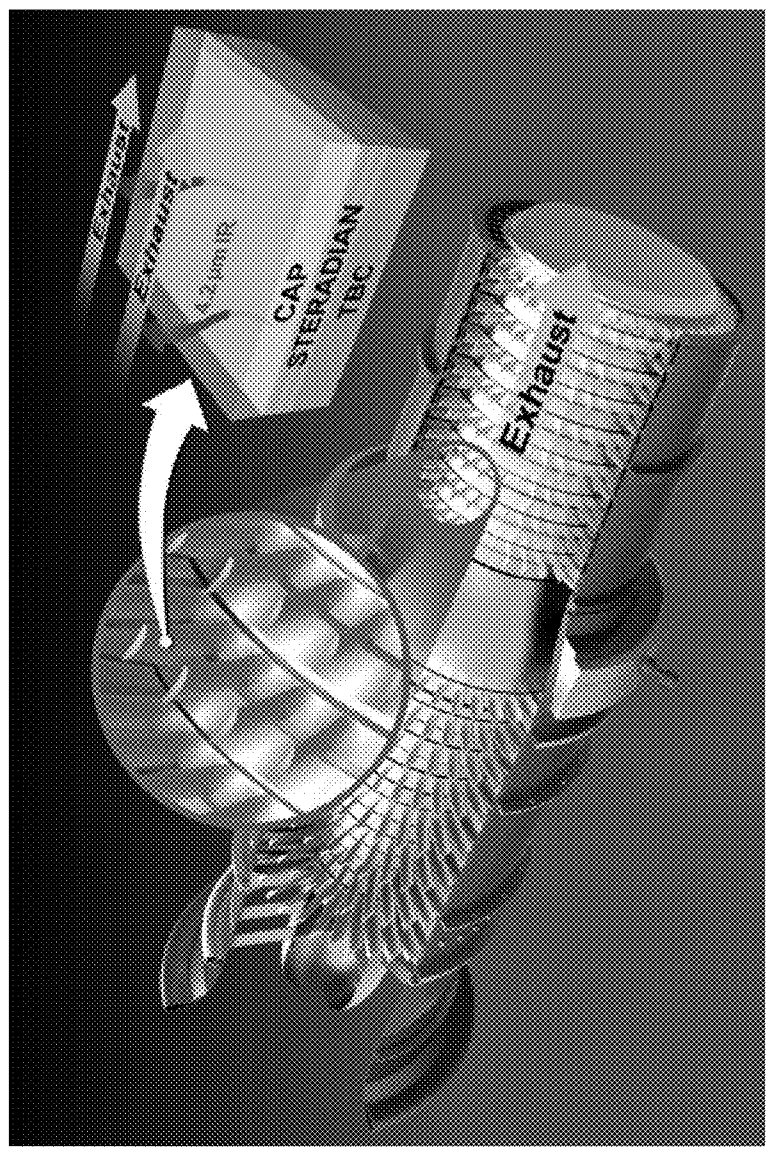
FIG. 13 is an example implementation of the heat exchanger assemblies incorporated into a gas turbine engine according to an embodiment of the disclosure.

Referring next to FIG. 13, an example gas turbine is shown that includes blades having the emitter surface described herein bonded thereto. In accordance with example implementations, the design of TBC coatings is enhanced to increase radiative heat transfer properties. Using principles of photonic metamaterial design, selective emitter coating can shift the broad band optical emissions from a hot turbine blade surface to radiate light tuned to the 4.2 μm infrared absorption band of $CO_2$, a constituent in the combustion turbine exhaust and part of the post combustion or hot section of the turbine engine. Because mid-IR light in this wavelength region is absorbed in the turbine exhaust within 4 cm of the emission source, the selective emitter layer substantially increases radiative heat transfer to the exhaust stream. Computational fluid dynamics simulations of a turbine blade with this coating show a 6% increase in turbine power output. The present disclosure can provide coated turbine blades suitable for operation at up to 1800° C. when integrated with a TBC.

Figure 14:
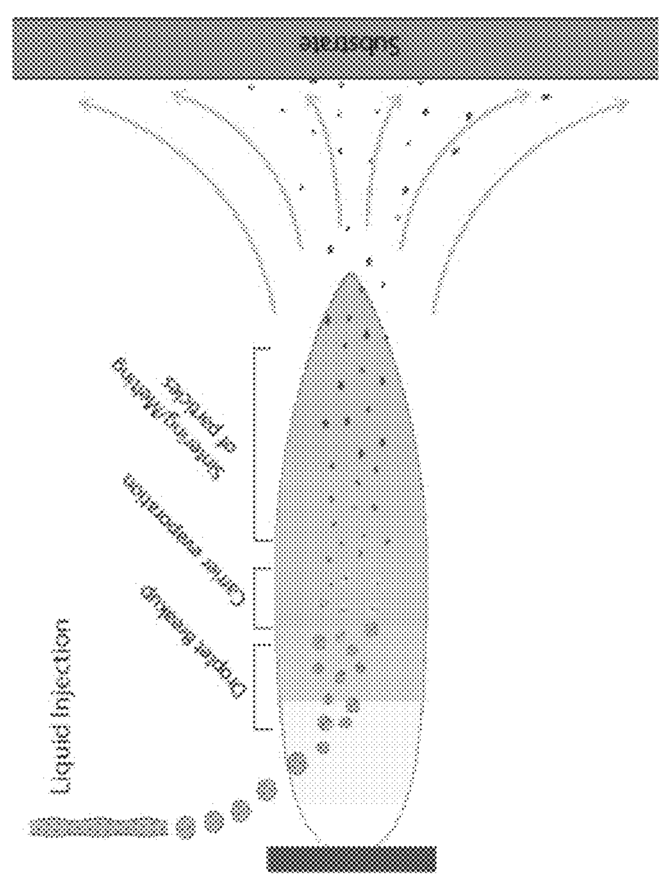
FIG. 14 is an example application of the emitter material according to an embodiment of the disclosure.

Referring next to FIG. 14, an example depiction of a turbine blade coating process is provided. In accordance with example implementations, fabrication can be performed using the depicted suspension plasma spray process to deliver the powder to the coating plasma plume via the injection of a water or alcohol-based slurry loaded with micron or sub-micron size powders. The slurry can provide the fine powders with sufficient momentum to become entrained in the plasma plume thereby facilitating the deposition of coatings with much finer features than those generated by standard air plasma spray where particle sizes are on the order of tens of microns. The schematic of the process is shown in FIG. 14 and demonstrates how the use of a suspension can provide the injection of sub-micron size particles into the plasma spray plume. The thicknesses of the layers can be tailored by controlling both the slurry particle size as well as the number of passes applied by the spray torch.

Because the emissivity layers will decrease the thermal load on the TBC significantly, this will facilitate the use of standard thermal barrier materials at higher operating temperatures than are currently allowable. The turbine blades can include of superalloy substrates coated with PtAl bond coats, SPS top coats, and emissivity layers.

Figure 15:
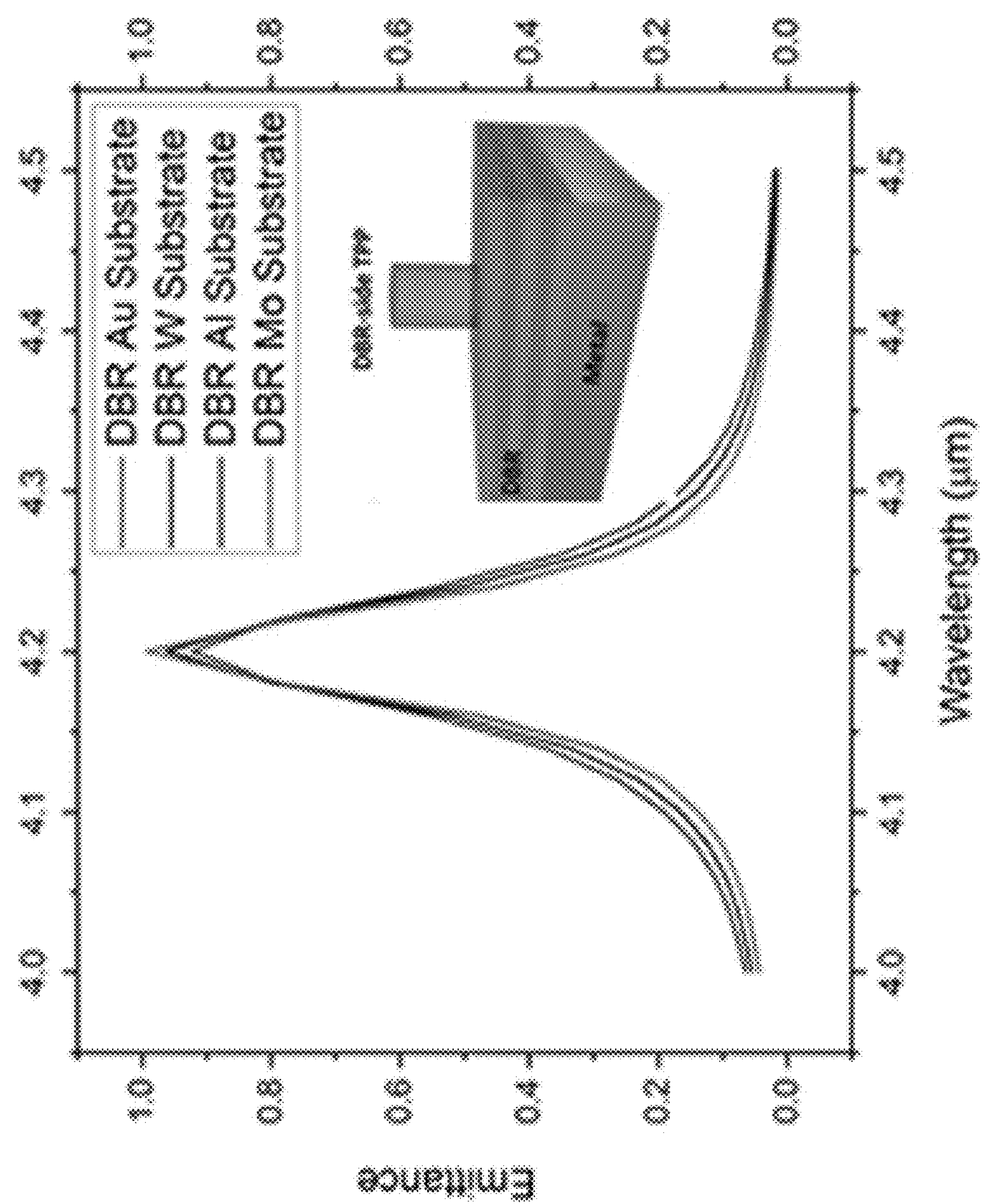
FIG. 15 is a depiction of the data relating to another emitter design and emissivity spectrum from a DBR stack according to an embodiment of the disclosure.
Figure 16:
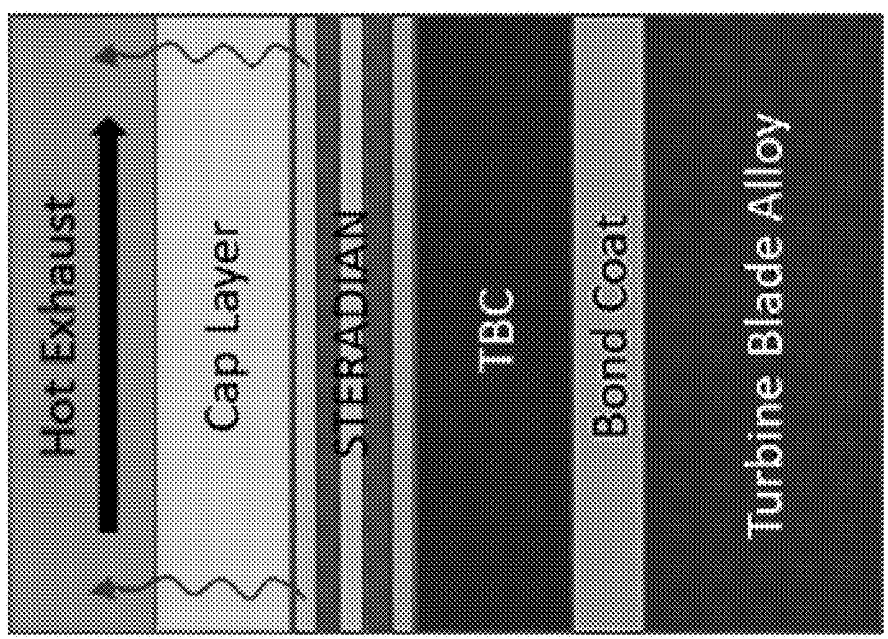
FIG. 16 is an example integration configuration coating for a turbine blade according to an embodiment of the disclosure.

Referring next to FIG. 15, data from an example emitter design is depicted. A second approach is with distributed Bragg reflector (DBR) structures (FIG. 16). These are heterostructure nanophotonic designs consisting of alternating thin-film layers of dielectric materials of varying refractive index. The choice of materials and thickness in the DBR stack can produce an optical excitation called a Tamm plasmon polariton (TPP) at specific wavelength. The assemblies can include alternating $Si/SiO_2$ layers that have near 100% emissivity in the target band as shown in FIG. 16. The emissivity spectrum was not sensitive to the choice of base metal used under the DBR stack.

Referring next to FIG. 16, an example emissivity coating assembly that includes a multiple layer configuration is depicted. The emissivity coating can be thinner than a TBC. The design can include a hard cap layer to provide protection from ablation by particles in the exhaust. The cap layer can be made out of a material that is transparent in the mid-IR range, Example materials can include yttria-stabilized zirconia or yttria alumina garnet (YAG) that is stable at >1500° C.

Figure 17:
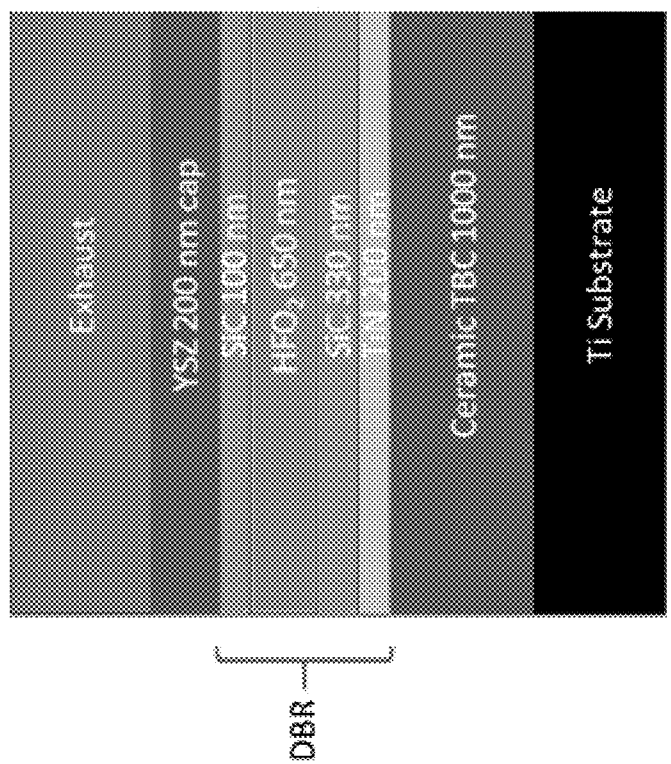
FIG. 17 is yet another example implementation of the turbine blade application according to an embodiment of the disclosure.

Referring next to FIG. 17, another example coating configuration is depicted. Here, a ceramic TBC is placed below the DBR stack that can include of a TiN (m.p. 2,930° C.) layer and alternating layers of SiC (m.p. 2,730° C.) and $HfO_2$ (m.p. 2,758° C.). Emissivity materials can be applied to turbine blades that are supported by metal and/or ceramic substrates. The coating configuration can include a cap layer for protection of the DBR. The predicted emittance as function of wavelength for this design is shown in FIG. 10 above. Adding a YSZ capping layer can have little impact on the optical performance of the emissivity layer due to its relatively high index of refraction and IR transparency. Emittance centered at 4.2 μm is still near 1 and FWHM remained around 1 μm.

Figure 18:
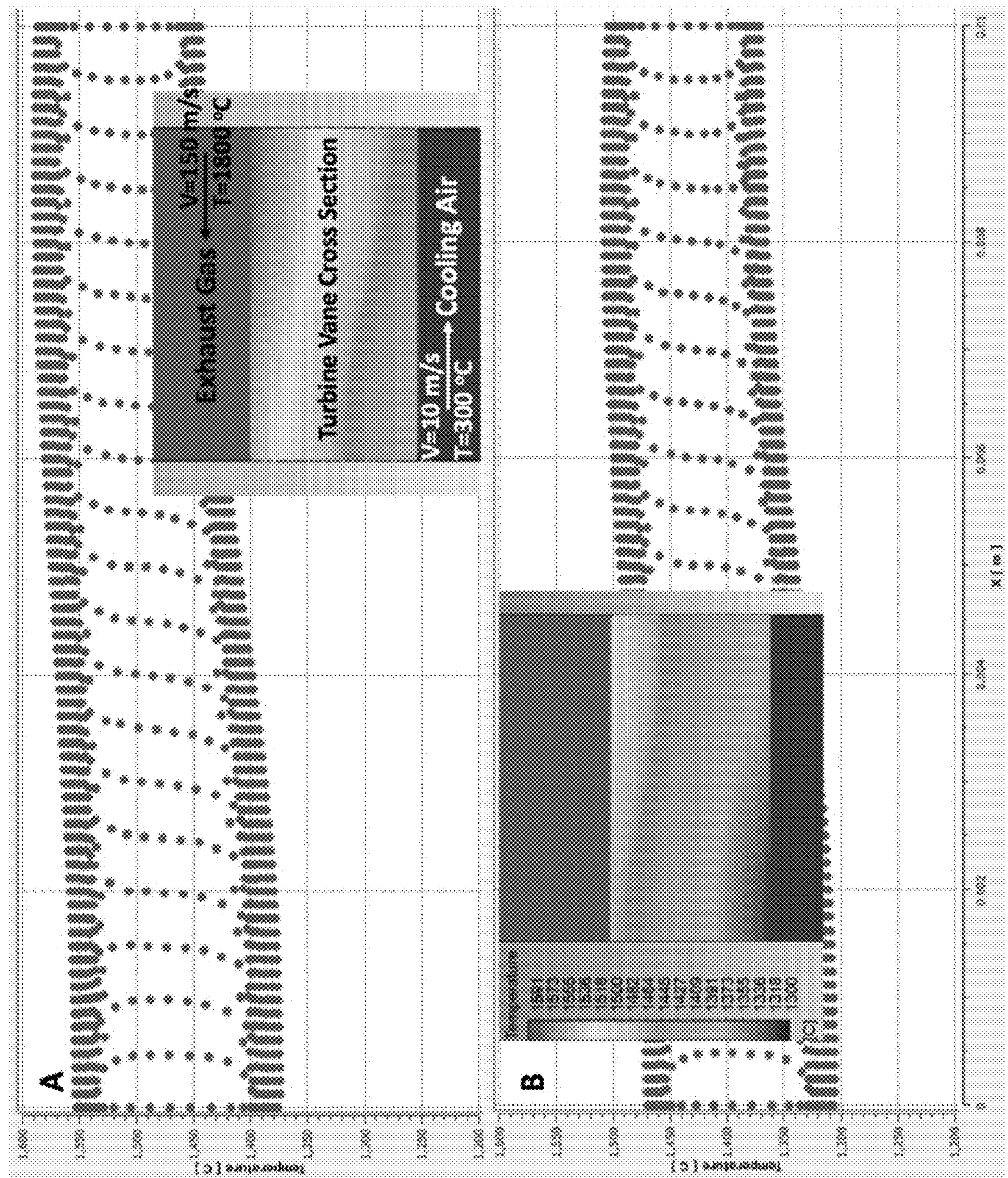
FIG. 18 is data depicting the baseline temperature profile of a turbine vane cross-section and the related impact of a turbine vane cross-section utilizing the emissive coatings of the present disclosure.

Referring next to FIG. 18, an example improvement of turbine engine operation is depicted. To assess impact on gas turbine performance with emissivity coated turbine blades, a numerical analysis was completed using ANSYS Fluent. Because the physics of this problem reduces to a comparative heat transfer analysis, a simplified approach was taken using 2-D geometry with counter hot/cool streams flowing over a rectangular vane (FIG. 19). The fluid in both streams was specified as air and the vane had the thermophysical properties of steel. Radiative heat transfer was treated with the Discrete Ordinance (DO) model built into Fluent.

FIG. 18 shows the results from the simulations of a single vane with hot exhaust gas flowing on the top side at 9 bar and cooling air (300° C.) flowing on the bottom. Both radiation and convection were included in the simulation. The comparison is between a baseline case (A) without a selective emissivity coating (SEC) and one with the coating (B). The only difference between these cases is the inclusion of a SEC on the exhaust-side vane surface. Broadband radiation occurs for the baseline case with a vane emissivity of 0.5, whereas focused, narrow-band radiation occurs with the emissivity coating. The impact is compelling, with peak surface temperatures dropping by 100° C. with the emissivity coating. Total heat flux from the exhaust stream to the cooling channel drops by 6.4% from 531 to 497 $kW/m^2$. This reduction represents the equivalent improvement in thermal efficiency of the Brayton cycle because the reduced heat flow to the coolant has been transferred to the exhaust for thrust or power generation. In a real turbine of course, the exhaust temperature and pressure falls as it expands through successive sets of rotor blades before discharge. Hence, the radiated power will fall and absorption path length in the exhaust will increase as well. However, this is compensated to some extent by the larger blade surface area and spacing in the downstream set of rotors.

In compliance with the statute, embodiments of the invention have been described in language more or less specific as to structural and methodical features. It is to be understood, however, that the entire invention is not limited to the specific features and/or embodiments shown and/or described, since the disclosed embodiments comprise forms of putting the invention into effect.

The invention claimed is:

1. A heating assembly comprising:

a heat-sinking substrate; and a selective emitter layer in thermal communication with the substrate, the layer configured to provide photons of a predefined wavelength upon receiving heat from the substrate.

2. The assembly of claim 1 wherein the heat-sinking substrate comprises a metal.

3. The assembly of claim 1 wherein the emitter layer comprises one or more of Si, Ag, Cr, Au, Ti, W, Zr, Hf, Nb, Ta, Al, and/or Mo, their corresponding oxides and/or carbides/nitrides/borides.

4. The assembly of claim 1 wherein the emitter layer is configured to include surface structures.

5. The assembly of claim 4 wherein the surface structures comprise one or more of pillars, recesses, cavities, platforms, and/or towers.

6. The assembly of claim 1 further comprising additional layers about the selective emitter layer, the layers comprising one or more of a cap layer and/or a bond coat.

7. A heat exchanger assembly comprising:

a heat-sinking substrate between two fluid passageways, a first fluid of the heat exchanger configured to provide heat to the heat-sinking substrate; and an emissivity layer in thermal communication with the substrate, the layer configured to provide photons of a predefined wavelength to a second fluid of the heat exchanger upon receiving heat from the heat-sinking substrate.

8. The heat exchanger assembly of claim 7 wherein the first fluid is configured as a heat transfer fluid.

9. The heat exchanger assembly of claim 7 wherein the second fluid comprises $scCO_2$.

10. The heat exchanger assembly of claim 7 wherein the second fluid can be within a passageway having interior and exterior walls, wherein both walls can include the emissivity layer.

11. The heat exchanger assembly of claim 10 further comprising passageways interior of the interior wall and exterior of the exterior wall, the passageways conveying the first fluid.

12. The heat exchanger assembly of claim 7 wherein the entire assembly is housed within a tubular housing.

13. A method for providing heat to a fluid comprising heating a layer upon a substrate to provide photons of a predetermined wavelength to a fluid from the layer.

14. The method of claim 13 wherein the fluid is $scCO_2$.

15. The method of claim 14 wherein the photons are provided at a wavelength between 3.8 and 4.5 um.

16. The method of claim 13 further comprising conductively heating the layer.

17. The method of claim 16 further comprising heating a heat-sinking substrate to conductively heat the layer.

18. The method of claim 17 further comprising convectively heating the heat-sinking substrate.

19. A turbine combustion engine comprising a turbine having one or more turbine blades, at least a portion of the blades in the hot section coated with an emissivity layer in thermal communication with the blade, the layer configured to provide photons to combustion products of the engine upon receiving heat from the turbine blade.

20. The turbine combustion engine of claim 19 wherein at least one of the combustion products is $CO_2$, the emissivity layer is configured to provide photons of a wavelength between 3.8 and 4.5 um.

21. The turbine combustion engine of claim 19 further comprising a bond coat upon the turbine blade.

22. The turbine combustion engine of claim 19 further comprising a capping barrier upon the emissivity layer.

23. The turbine combustion engine of claim 22 wherein the capping barrier comprises YSZ and/or YAG.

24. The turbine combustion engine of claim 19 wherein the emissivity layer comprises one or more of Si, Ag, Cr, Au, Ti, W, Zr, Hf, Nb, Ta, Al, and/or Mo, their corresponding oxides and/or carbides/nitrides/borides.

* * * * *

UNITED STATES PATENT AND TRADEMARK OFFICE

CERTIFICATE OF CORRECTION

PATENT NO. : 11,255,220 B1
APPLICATION NO. : 17/062259
DATED : February 22, 2022
INVENTOR(S) : B. Peter McGrail, Jeromy J. Jenks and Bruce E. Bernacki It is certified that error appears in the above-identified patent and that said Letters Patent is hereby corrected as shown below:

On the Title Page

Item (56) References Cited, page 2, 2nd Column, 13th Line - Replace "Iverson et al., "Supercritical C02 Brayton Cycles for Solar-Thermal" with --Iverson et al., "Supercritical CO2 Brayton Cycles for Solar-Thermal--

Signed and Sealed this
Seventh Day of February, 2023

Katherine Kelly Vidal

Katherine Kelly Vidal
*Director of the United States Patent and Trademark Office*